United States Patent [19]

Rogers

[11] Patent Number: 4,822,007

[45] Date of Patent: Apr. 18, 1989

[54] SUSPENSION SYSTEM FOR A TRUCK OR THE LIKE

[76] Inventor: Ralph R. Rogers, 733 W. 21st, So. Sioux City, Nebr. 68776

[21] Appl. No.: 819,591

[22] Filed: Jan. 17, 1986

[51] Int. Cl.⁴ ............................................. B60G 11/34
[52] U.S. Cl. ..................................... 267/32; 280/697; 280/712
[58] Field of Search ......................... 267/31, 32, 54 C; 280/697, 712

[56] References Cited

U.S. PATENT DOCUMENTS

| 923,162 | 6/1909 | Garvey | 267/32 |
| 1,113,370 | 10/1914 | Ostendorf | 267/241 |
| 1,119,021 | 12/1914 | Klenke | 267/32 |
| 1,421,977 | 7/1922 | Mickley | 267/32 |
| 3,309,107 | 3/1967 | Chieger | 280/712 |
| 3,970,293 | 7/1976 | Sweet et al. | 267/31 |
| 4,580,798 | 4/1986 | Roelofs | 280/712 X |
| 4,580,809 | 4/1986 | Leaf | 280/712 |

Primary Examiner—George E. A. Halvosa

[57] ABSTRACT

A suspension system is described which interconnects each of the longitudinally extending frame members of a truck or the like to a transversely extending axle housing positioned therebelow. Each of the suspension systems comprises a leaf spring assembly connected to the associated frame member forwardly of the axle housing. The leaf spring assembly is connected, intermediate its ends, to the axle housing. An elongated support is pivotally connected to the axle housing beneath the leaf spring assembly and has the rearward end of the leaf spring assembly pivotally connected thereto intermediate its ends. The lower end of an air spring is supported on the rearward end of the support and has its upper end operatively secured to the frame member.

2 Claims, 2 Drawing Sheets

SUSPENSION SYSTEM FOR A TRUCK OR THE LIKE

BACKGROUND OF THE INVENTION

This invention relates to a suspension system and more particularly to an air suspension system for a truck or the like.

Conventional single axle trucks normally have a transversely extending axle which is positioned beneath longitudinally extending frame members. Ordinarily, a leaf spring assembly connects each of the frame members to the axle. The conventional suspension system just described results in a less than smooth ride. Further, the conventional suspension system does not normally have the ability to compensate for very heavy loads. Some attempts have been made to provide air suspension systems for trucks to overcome the disadvantages of the conventional systems, but the same are extremely expensive and normally may not be installed on the truck after the truck has been manufactured.

Therefore, it is a principal object of the invention to provide an improved suspension system for a truck or the like.

A further object of the invention is to provide a suspension system for a truck or the like which may be mounted on the suspension system after the truck has been manufactured.

A further object of the invention is to provide a suspension system which may be easily installed on the existing truck suspension system.

Yet another object of the invention is to provide a suspension system which greatly improves the riding characteristics of the truck or the like.

Still another object of the invention is to provide a suspension system for a truck or the like having the ability to compensate for heavy loads.

Still another object of the invention is to provide an improved suspension system for a truck or the like which is durable and safe.

These and other objects will be apparent to those skilled in the art.

SUMMARY OF THE INVENTION

Figure 1:
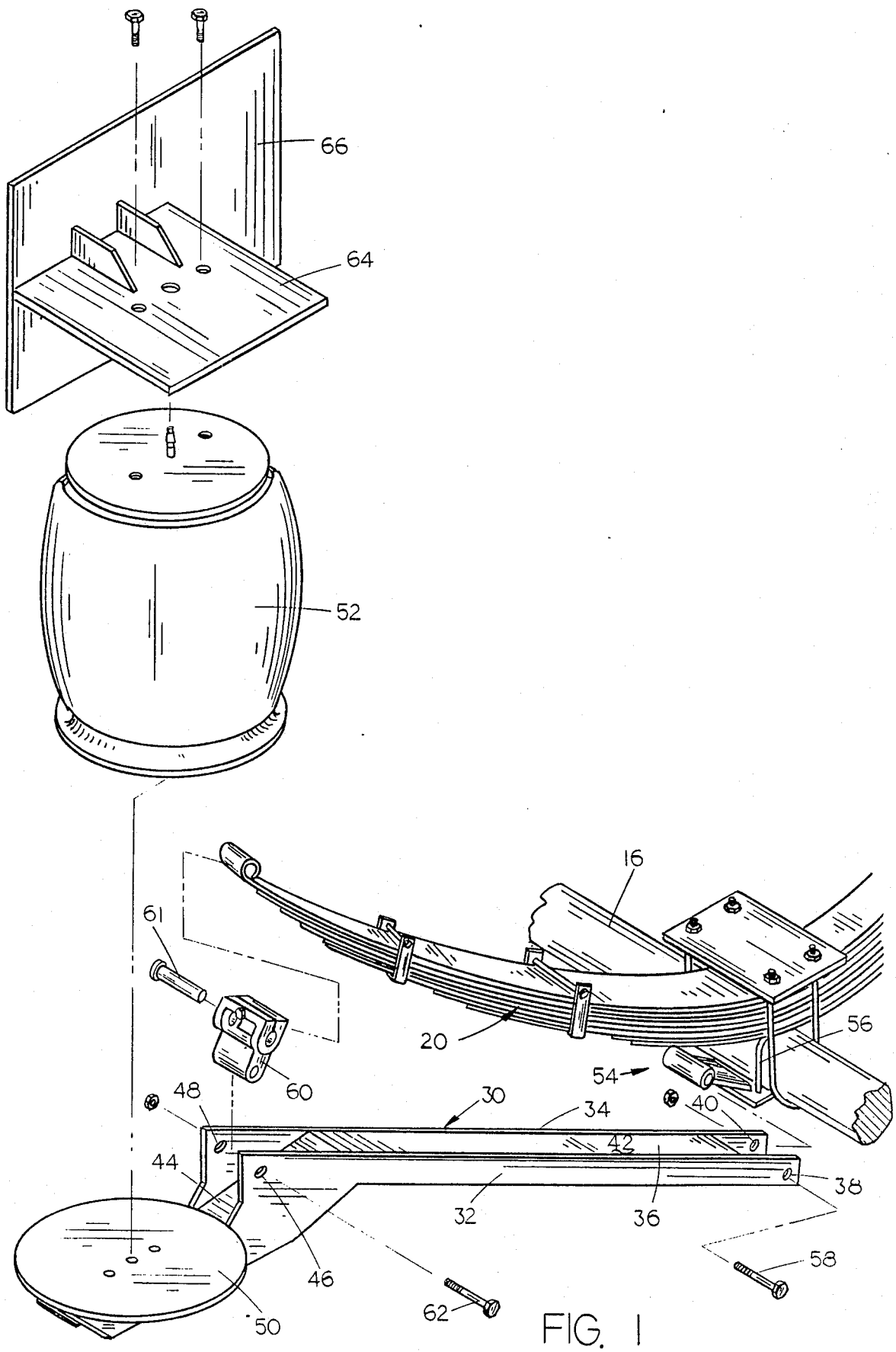
FIG. 1 is an exploded perspective view of the suspension system of this invention.
Figure 2:
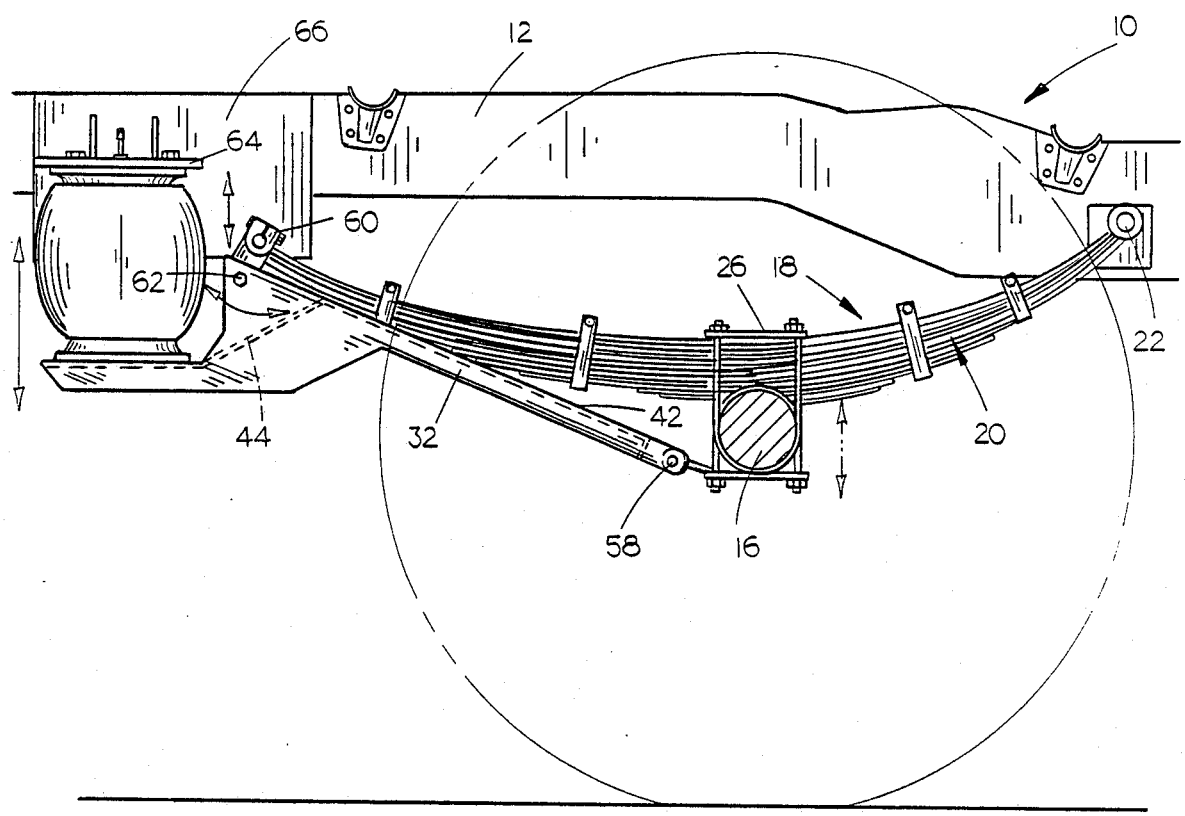
FIG. 2 is a side view of the suspension system.
Figure 3:
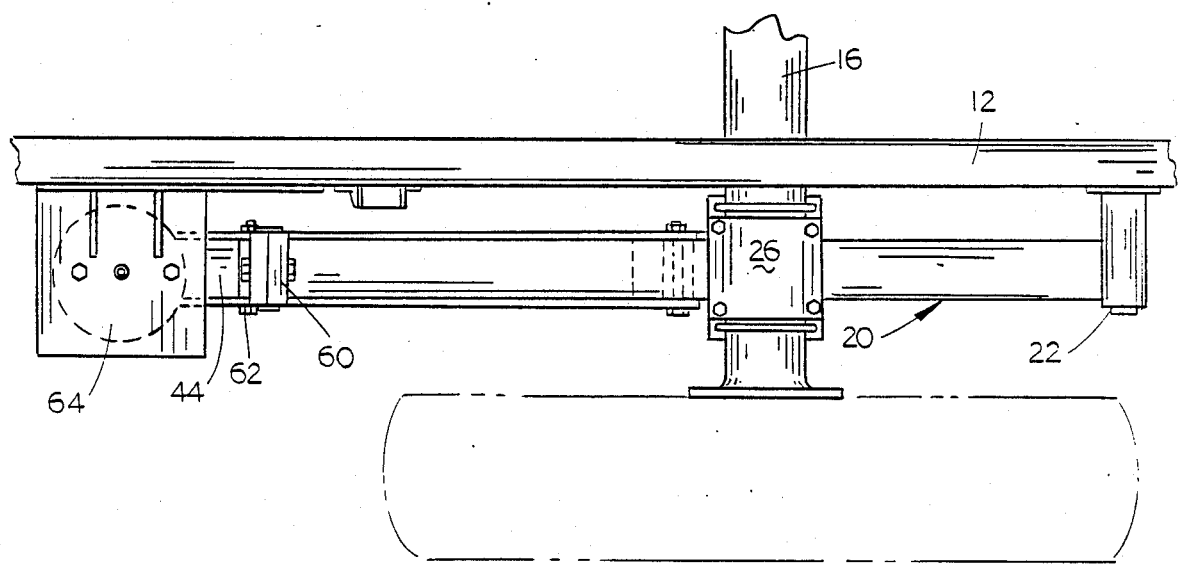
FIG. 3 is a top view of the suspension system.

A suspension system interconnects each of the longitudinally extending frame members of a truck or the like to a transversely extending axle housing positioned therebelow. A leaf spring assembly is positioned adjacent each of the frame members and is conventionally connected at its forward end to the associated frame member and is conventionally connected to the axle housing by U-bolts or the like. An elongated support means is positioned below the rearward end of each of the leaf spring assemblies and has its forward end pivotally secured to the axle housing. The rearward end of the support means has the lower end of an air spring mounted thereon. The upper end of the air spring engages a plate which extends laterally from a bracket secured to the associated frame member. The rearward end of the leaf spring assembly is pivotally secured to the support means forwardly of the air spring. The air spring yieldably resists the upward movement of the axle housing and the rearward end of the leaf spring assembly towards the frame member and yieldably resists the downward movement of the frame member towards the actual housing.

DESCRIPTION OF THE PREFERRED EMBODIMENT

In the drawings, the numeral 10 refers to a conventional truck including a pair of longitudinally extending frame members 12 and 14 (not shown) having a transversely extending axle housing 16 positioned therebelow. Ground engaging wheels are secured to the ends of the axle positioned in the axle housing in conventional fashion. A suspension system 18 normally connects each of the frame members 12 and 14 to the axle housing 16. Each of the suspension systems 18 includes a leaf spring assembly 20 connected at its forward end to the associated frame member by means of a shackle 22. Leaf spring assembly 20 is connected, intermediate the length thereof, to axle housing 16 by U-bolt assembly 26. The rearward end of leaf spring assembly 20 would normally be connected to the associated frame member by means of a suitable shackle. It is this conventional structure which is modified to achieve the suspension system of this invention.

To modify the conventional suspension system, the rearward end of the leaf spring assembly 20 is disconnected from the shackle secured thereto. If the shackle poses an obstruction problem, the shackle may be removed from the frame member by a cutting torch or the like. In the suspension system of this invention, an elongated support means 30 operatively interconnects the axle housing 16, leaf spring assembly 20 to the associated frame member through an air spring as will now be described. Support means 30 includes spaced-apart sides 32 and 34 having a spacer 36 secured thereto and extending therebetween as seen in the drawings. The forward ends of sides 32 and 34 are provided with openings 38 and 40 formed therein which are positioned forwardly of the forward end of the spacer 36. As seen in the drawings, spacer 36 includes a forward end portion 42 and rearward end portion 44 which extends at an angle therebetween. Sides 32 and 34 are provided with openings 46 and 48 intermediate the ends thereof. Air spring support or plate 50 is provided on the rearward end of the support means 30 and is adapted to have the air spring 52 mounted thereon.

The numeral 54 refers to a bracket which is secured to the axle housing 16 by means of U-bolt assembly 56. The forward end of support means 30 is pivotally secured to the bracket 54 by means of bolt 58 extending through the openings 38 and 40 of support means 30. A hanger assembly 60 is pivotally secured to the rearward end of spring assembly 20 by bolt 61 and is pivotally secured to the support means 30 by means of bolt 62 extending through openings 46 and 48 and the hanger 60. The lower end of air spring 52 is mounted on the plate 50 as previously described. The upper end of the air spring 52 is operatively secured to the frame member 12 by means of a top plate 64 which is secured to and which extends laterally from bracket 66 secured to the frame member 12. The amount of air in the air springs may be selectively varied in conventional fashion. It is preferred that the support means 30 at each side of the truck be interconnected by means of a stabilizer bar assembly to prevent lateral movement of the rearward ends of the suspension system.

Prior to use, the air spring 52 is inflated to the desired pressure depending upon the load being carried by the truck. In use, bumps or the like on the road surface which are transmitted to the wheels of the truck causes the axle housing 16 to be moved upwardly towards the frame members of the truck. The rearward end of the leaf spring assembly may move upwardly and downwardly through its pivotal connection with the support means 30. The forward end of the support means 30 also pivots slightly as the axle housing moves upwardly and downwardly relative to the frame member. The air spring resists the upward movement of the rearward end of the support means 30 and also yieldably resists the downward movement of the frame member when a heavy load is carried by the truck. The fact that the support means 30 operatively interconnects the rearward end of the leaf spring assembly with the axle housing and with the air spring results in a much smoother "ride" being obtained than with the conventional leaf spring assembly. This is especially true when the truck is carrying passengers, horses, etc.

Thus it can be seen that the invention accomplishes at least all of its stated objectives.

I claim:

1. A suspension system for wheeled vehicles including a pair of spaced-apart longitudinally extending frame members having rearward and forward ends, a transversely extending axle housing positioned beneath said frame members forwardly of the rearward end thereof, comprising, a leaf spring means having rearward and forward ends positioned outwardly of each of said frame members and having its forward end secured to the associated frame member forwardly of said axle housing, said leaf spring means being rigidly secured, intermediate its ends, to said axle housing, the rearward end of said leaf spring means being positioned rearwardly of the associated axle housing, a rigid elongated support means having rearward and forward ends, the forward end of said support means being operatively secured to said axle housing, said support means being secured, forwardly of its rearward end, to the rearward end of said leaf spring means, an upstanding air spring means having upper and lower ends, the lower end of said air spring means being mounted on the rearward end of said support means, means rigidly operatively connecting the upper end of said air spring means to the associated frame member whereby said air spring means yieldably resists the upward movement of said axle housing and the rearward end of said leaf spring means towards said frame member and yieldably resists the downward movement of said frame member towards said axle housing, and a bracket secured to said axle housing, said forward end of said support member being pivotally secured to said bracket.

2. The suspension system of claim 1 wherein the rearward end of said leaf spring means is pivotally secured to said support means.

* * * * *